United States Patent [19]

Hara et al.

[11] Patent Number: 4,783,134
[45] Date of Patent: Nov. 8, 1988

[54] MICROWAVE HOLOGRAPH DEVICE

[75] Inventors: Tsutomu Hara; Yoshiji Suzuki, both of Hamamatsu, Japan; Ming H. Wu, Middlesex, N.J.

[73] Assignee: Hamamatsu Photonics Kabushiki Kaisha, Hamamatsu, Japan

[21] Appl. No.: 887,611

[22] Filed: Jul. 21, 1986

[30] Foreign Application Priority Data

Aug. 20, 1985 [JP] Japan ................................ 60-182793

[51] Int. Cl.$^4$ .......................... G02B 27/22; G01S 9/00
[52] U.S. Cl. .................................. 350/3.64; 350/3.62; 350/356; 342/35; 342/55
[58] Field of Search .................... 342/35, 55; 350/3.62, 350/3.66, 3.64, 356, 3.6; 358/90

[56] References Cited

U.S. PATENT DOCUMENTS

| | | | |
|---|---|---|---|
| 3,488,656 | 1/1970 | Anderson | 358/90 |
| 3,566,021 | 2/1971 | Jakes, Jr. | 350/3.66 |
| 3,632,183 | 1/1972 | Haines | 350/3.64 |
| 3,680,087 | 7/1972 | Gustafson et al. | 342/55 |
| 3,757,332 | 9/1973 | Tricoles | 350/3.64 |
| 3,997,898 | 12/1976 | LeGrand | 342/35 |
| 4,481,531 | 11/1984 | Warde et al. | 350/374 |
| 4,678,286 | 7/1987 | Hara | 350/356 |

OTHER PUBLICATIONS

"Acoustics: Making 3-D Pictures with Sound", Time, Nov. 10, 1967, p. 64.
McGraw-Hill Encyclopedia of Science and Technology, "Image Tube (Astronomy)", vol. 7 (1977), pp. 31b-33.
McGraw-Hill Encyclopedia of Science and Technology, "Phototube", vol. 10 (1977), pp. 210B-213.
Nabil H. Farhat et al, "An Electrooptics and Microwave Optics Program in Electrical Engineering", IEEE Transactions on Education, vol. E-23, No. 2 (May 1980), pp. 75-83.
McGraw-Hill Encyclopedia of Science and Technology, "Optical Modulators", vol. 9 (1977), pp. 405-407.
Thomas H. Moore et al, "Design of an Electrooptic Light Valve Projection Display", IEEE Transactions on Electron Devices, vol. ED-17, No. 5 (May, 1970), pp. 423-428.

Primary Examiner—Bruce Y. Arnold
Assistant Examiner—Martin Lerner
Attorney, Agent, or Firm—Spencer & Frank

[57] ABSTRACT

In a microwave holographic device, the main lobe of a microwave antenna is spatially scanned to receive a microwave signal reflected from an object. The received microwave signal is mixed with a reference signal to generate two-dimensional electric information, synchronized with the scanning. The two-dimensional electric information is used to change the optical properties of an electrooptic material, and then the optical property changes are read out to obtain a holographic image.

9 Claims, 1 Drawing Sheet

MICROWAVE HOLOGRAPH DEVICE

BACKGROUND OF THE INVENTION

The present invention relates to a microwave holograph device which can detect an object by scanning the microwaves.

Microwaves can be transmitted to a remote location via a free space and then reflected from a metal surface. However objects such as overcoats and handbags are transparent with respect to microwaves. For this reason microwaves can be used to detect flying objects and dangerous weapons disregarding other materials. In addition, the detected objects and weapons can be reproduced in a space by microwave holography.

A holographic image obtained by microwaves is first displayed on a CRT. An image on the CRT is then taken by photographic camera so as to form a holographic image, and then the holographic image is reproduced in a space by a light beam so that the reproduced image can easily be observed by an inspector.

The conventional image reproduction technique by means of the microwave holography, however, cannot be used to detect an image in real time because the holographic image obtained by the microwave technique must be converted into a photographic film image before the image reproduction.

SUMMARY OF THE INVENTION

The objective of the present invention is to provide a microwave holograph device which can reproduce the image of an object in real time.

A microwave holograph device in accordance with the present invention consists of microwave radiation means to radiate a microwave signal to an object, microwave receiving means to receive a microwave signal reflected from an object by spatially scanning the main lobe thereof, mixing means to mix the microwave signal received by the microwave receiving means with the reference signal related to the radiated microwave signal, conversion means to convert the output of the mixing means into two-dimensional electric information synchronized with the scanning, an electrooptic material to yield optical property changes corresponding to the electric information, and an optical system to read out the optical property changes of the electrooptic material.

DESCRIPTION OF THE PREFERRED EMBODIMENTS

Figure 1:
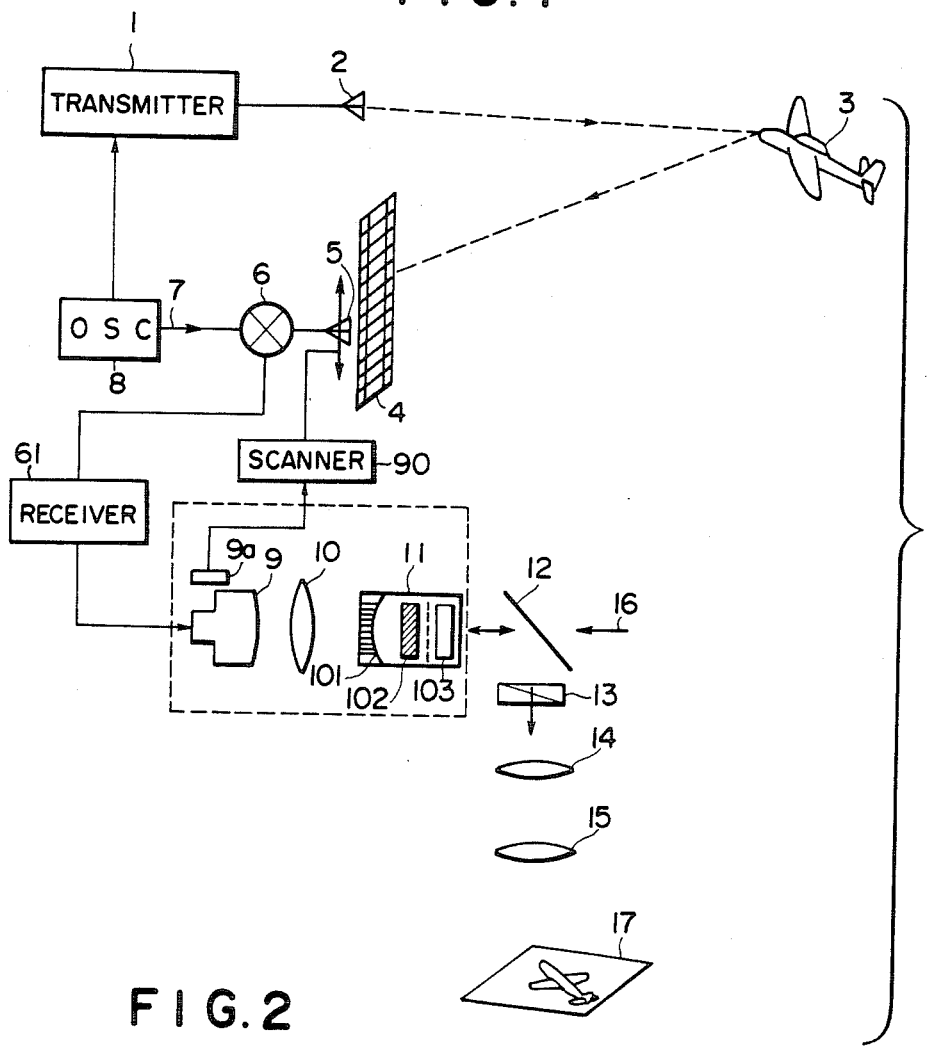
FIG. 1 shows a block diagram of a first embodiment of the microwave holograph device in accordance with the present invention.

The present invention will hereafter be described in detail referring to the drawings.

FIG. 1 shows a block diagram of an embodiment of the microwave holograph device in accordance with the present invention.

The microwave signal generated by microwave oscillator 8 (i.e., operating at 70 GHz) is conveyed to microwave transmitter 1 and is then radiated by antenna 2 to object 3. The signal reflected from object 3 is distributed over apertures 4.

The microwave signal intensity and phase distribution patterns are detected by scanning receiving antenna 5. Receiving antenna 5 is driven by scanning drive circuit 90, and it moves regularly so that the microwave signals at the successive locations of apertures 4 can be received successively.

Mixer 6 is used to mix the detected microwave signal with a reference (L0) signal fed from microwave oscillator 8 through cable 7 so that a hologram signal is generated and fed to receiver 61.

The time-sequential hologram signal output from receiver 61 is then input to CRT 9.

A deflection signal synchronized with the output of the scanning drive circuit 90 is applied to deflection means 9a of CRT 9 so as to form a two-dimensional microwave hologram.

The image on the surface of CRT 9 is recorded on spatial light modulator 11 via lens 10. Spatial light modulator 11 consists of photocathode 101, microchannel plate (MCP) 102, and electrooptic crystal 103, which are housed in a vacuum envelope.

Photocathode 101 emits photoelectrons corresponding to the image formed thereon, and the photoelectrons are multiplied by microchannel plate 102. An electron charge pattern is formed on the surface of electrooptic crystal 103. The refractive index of the electrooptic crystal 103 is changed in accordance with the electron charge pattern formed thereon.

The electron charge pattern is thus recorded in the form of a refractive index change of electrooptic crystal 103, and the microwave hologram obtained by recording the electron charge pattern, which is recognized as a refractive index change of the electrooptic crystal 103, can be read out by means of laser beam 16. The image read out of the electrooptic crystal 103 is incident on lens 14 wherein a Fourier transform can be done, and the image obtained is focused on screen 17 via lens 15.

The reproduced image of object 3 is thus projected onto screen 17.

Figure 2:
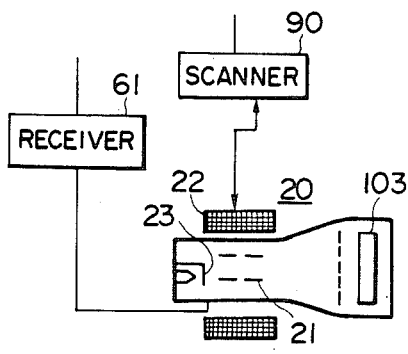
FIG. 2 shows a block diagram of a second embodiment of the spatial light modulator in the microwave holograph device in accordance with the present invention.

The spatial light apparatus enclosed within the dashed lines in FIG. 1 in the preferred embodiment of the present invention consists of CRT 9, lens 10 and spatial light modulator 11. In addition, the time-sequential signal can directly be written into electrooptic crystal 103 if a spatial light apparatus 20 of the electron beam address type, which includes an electron gun 23 and the crystal 103 as shown in FIG. 2, is used in place of the spatial light modulator 11. If spatial light apparatus 20 is used, the configuration is simple. In FIG. 2, reference number 21 indicates a deflection electrode and reference number 22 indicates a deflection coil.

As described heretofore, the microwave holograph device in accordance with the present invention consists of microwave radiation means to radiate the microwave signal to an object, microwave receiving means to receive the microwave signal reflected from the object by spatially scanning the main lobe thereof, mixing means to mix the microwave signal received by microwave receiving means with the reference signal related to the radiated microwave signal, conversion means to convert the output of the mixing means into two-dimensional electric information synchronized with the scanning, an electrooptic material to yield optical property changes corresponding to the electric information, and an optical system to read out the optical property changes of the electrooptic material. Such a microwave holographic device can be used to form and reproduce a microwave holograph image in real time.

It can thus be applied to many fields, including identification and testing of an object.

What is claimed is:

1. A microwave holograph device, comprising:
   microwave radiation means for radiating a microwave signal to an object,
   microwave receiving means for receiving the microwave signal reflected from the object by spatially scanning the main lobe thereof,
   mixing means for mixing the microwave signal received by the microwave receiving means with a reference signal related to said radiated microwave signal,
   conversion means for converting the output of said mixing means into two-dimensional electric information synchronized with said scanning,
   an electrooptic material to yield optical property changes corresponding to said two-dimensional electric information, and
   an optical system to read out the optical property changes of said electrooptic material.

2. The device of claim 1, wherein the microwave radiation means comprises a transmitter, an oscillator which provides a signal to the transmitter, and a transmitting antenna connected to the transmitter.

3. The device of claim 2, wherein the reference signal corresponds to the oscillator signal.

4. The device of claim 1, wherein the receiving means comprises a receiving antenna, and an array of apertures disposed between the object and the receiving antenna, at least one of the receiving antenna and the array of apertures being movably mounted.

5. The device of claim 1, wherein the conversion means comprises a cathode ray tube.

6. The device of claim 1, wherein the optical property changes are changes in the index of refraction of the electrooptic material.

7. A microwave holograph device, comprising:
   microwave radiation means for radiating a microwave signal to an object;
   microwave receiving means for receiving the microwave signal reflected from the object by spacially scanning the main lobe thereof;
   mixing means for generating a microwave hologram signal by mixing the microwave signal received by the microwave receiving means with a reference signal related to the radiated microwave signal;
   a electrooptic material;
   means responsive to the microwave hologram signal for depositing a two-dimensional charge pattern on the electrooptic material to create a corresponding two-dimensional pattern in the optical index of refraction of the electrooptic material; and
   optical system means for reading out the two-dimensional pattern in the optical index of refraction of the electrooptic material to generate a visually perceptible image of the object, the optical system means including means for exposing the electrooptic material with a laser beam.

8. The device of claim 7, wherein the means responsive to the microwave hologram signal comprises a cathode ray tube, and wherein the electrooptic material is disposed inside the cathode ray tube.

9. The device of claim 7, wherein the means responsive to the microwave hologram signal comprises a cathode ray tube having a screen which emits light, and further comprising a photocathode which receives light from the screen and a microchannel plate which receives photoelectrons from the photocathode, the electrooptic material being disposed adjacent the microchannel plate.

* * * * *